United States Patent
Yoshino

(10) Patent No.: US 11,958,320 B2
(45) Date of Patent: Apr. 16, 2024

(54) TIRE

(71) Applicant: SUMITOMO RUBBER INDUSTRIES, LTD., Hyogo (JP)

(72) Inventor: Masayuki Yoshino, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 83 days.

(21) Appl. No.: 17/234,919

(22) Filed: Apr. 20, 2021

(65) Prior Publication Data

US 2021/0331529 A1    Oct. 28, 2021

(30) Foreign Application Priority Data

Apr. 28, 2020    (JP) .................................. 2020-079584

(51) Int. Cl.
*B60C 11/12*    (2006.01)
*B60C 11/03*    (2006.01)

(52) U.S. Cl.
CPC ... *B60C 11/1236* (2013.01); *B60C 2011/0346* (2013.01)

(58) Field of Classification Search
CPC ............ B60C 11/0323; B60C 11/1236; B60C 11/1281; B60C 11/13; B60C 2011/0344; B60C 2011/0346; B60C 2011/0348; B60C 2011/0397; B60C 2011/0355
See application file for complete search history.

(56) References Cited

U.S. PATENT DOCUMENTS

| | | | | |
|---|---|---|---|---|
| 2005/0103414 A1* | 5/2005 | Suzuki | ..................... | B60C 11/12 152/209.15 |
| 2007/0125467 A1* | 6/2007 | Durand | ............... | B60C 11/0309 152/209.22 |
| 2009/0159167 A1* | 6/2009 | Scheuren | ............ | B60C 11/1281 425/470 |
| 2010/0307651 A1* | 12/2010 | Castellini | ................ | B60C 11/12 152/209.21 |
| 2013/0105052 A1* | 5/2013 | Tanaka | ................ | B60C 11/0306 152/209.17 |

(Continued)

FOREIGN PATENT DOCUMENTS

| | | | | |
|---|---|---|---|---|
| JP | 2012096604 | A | * | 5/2012 |
| JP | 2012153157 | A | * | 8/2012 |

(Continued)

OTHER PUBLICATIONS

Machine translation JP 2012096604A (Year: 2012).*
Machine translation JP 2012153157A (Year: 2012).*
WO 2020100337 machine translation (Year: 2020).*

*Primary Examiner* — Justin R Fischer
*Assistant Examiner* — Wendy L Boss
(74) *Attorney, Agent, or Firm* — Greenblum & Bernstein, P.L.C.

(57) ABSTRACT

A tire having a tread portion provided with a first circumferential groove and a second circumferential groove each extending in the tire circumferential direction, and lateral grooves connecting between the first circumferential groove and the second circumferential groove. The first circumferential groove extends zigzag and comprises a radially outer first portion having the smallest width and a radially inner second portion having a width larger than that of the first portion.

16 Claims, 9 Drawing Sheets

(56) References Cited

U.S. PATENT DOCUMENTS

| | | | | |
|---|---|---|---|---|
| 2015/0059943 A1* | 3/2015 | Radulescu | ............... | B60C 11/04 |
| | | | | 152/209.17 |
| 2016/0243898 A1* | 8/2016 | Ito | ..................... | B60C 11/0306 |
| 2017/0313135 A1* | 11/2017 | Ichimura | ............... | B60C 11/1392 |
| 2019/0061431 A1* | 2/2019 | Shibai | .................. | B60C 11/03 |
| 2020/0079156 A1 | 3/2020 | Okazaki | | |
| 2021/0061018 A1* | 3/2021 | Sato | ..................... | B60C 11/12 |

FOREIGN PATENT DOCUMENTS

| | | | | |
|---|---|---|---|---|
| JP | 2018-202956 A | 12/2018 | | |
| WO | WO-2020100337 A1 * | 5/2020 | ............ | B60C 11/0306 |

\* cited by examiner

US 11,958,320 B2

TIRE

TECHNICAL FIELD

The present invention relates to a tire, more particularly to a tread groove.

BACKGROUND ART

There has been known a tire provided in the tread portion with a circumferential groove, and two rib-shaped land portions adjacent to each other across a circumferential groove, wherein side wall surfaces of the respective two rib-shaped land portions which are facing each other through the circumferential groove, are each provided with a protrusion protruding toward the other of the side wall surfaces and extending in the tire circumferential direction. (See, Patent Document 1)

Patent Document 1: Japanese Patent Application Publication NO. 2018-202965

SUMMARY OF THE INVENTION

Problems to be Solved by the Invention

The tire disclosed in Patent Document 1 is required to be further improved in drainage performance, It is therefore, a primary object of the present invention to provide a tire having excellent drainage performance even in the last stage of tread wear life.

According to the present invention, a tire comprises a tread portion provided with: a first circumferential groove and a second circumferential groove each extending in the tire circumferential direction; and lateral grooves connecting between the first circumferential groove and the second circumferential groove,
wherein
the first circumferential groove is a zigzag groove, and comprises a radially outer first portion having a smallest groove width, and a radially inner second portion which is positioned inside the first portion in a tire radial direction and is wider in groove width than the first portion.

It is preferable that the first circumferential groove comprises first approximate portions at which the first circumferential groove is closest to the second circumferential groove, and of which depth is not more than a depth of the second circumferential groove.

It is preferable that the lateral grooves are connected to the first approximate portions.

It is preferable that the second circumferential groove comprises second approximate portions closest to the first circumferential groove, and the lateral grooves are connected to the second approximate portions.

The tread portion may comprise a first land portion disposed on one side of the second circumferential groove which side is the first circumferential groove side, and a second land portion disposed on the other side of the second circumferential groove which side is opposite to the first circumferential groove side, and
it is desirable that the lateral grooves extend from the first land portion across the second circumferential groove and terminate within the second land portion.

It is preferable that the groove width w1 of the radially outer first portion is 1 to 2 mm.

It is preferable that the radially inner second portion has a largest groove width w2 of from 2 to 12 mm.

It is preferable that the largest groove width w2 of the second portion is 2 to 6 times the groove width w1 of the first portion.

It is preferable that the shortest distance H2 in the tire radial direction from the groove bottom of the first circumferential groove to the radially inner end of the first portion is in a range from ⅓ to ⅔ times the depth H1 of the first circumferential groove. (⅓=<H2/H1=<⅔)

It is preferable that the first circumferential groove comprises a third portion which is disposed outside the first portion in the tire radial direction, and in which the groove width is gradually increased toward the outside in the tire radial direction.

It is preferable that the tread portion is further provided with first sipes extending from the first circumferential groove to the second circumferential groove.

It is preferable that, with respect to a tire equator, the second circumferential groove is disposed outside the first circumferential groove in the tire axial direction.

It is preferable that the first circumferential groove is disposed on each side of the tire equator, and
the tread portion is further provided with a third circumferential groove extending in the tire circumferential direction and disposed between the first circumferential grooves.

It is preferable that the tread portion is further provided with second sipes extending from the third circumferential groove to the first circumferential grooves.

The tread portion may be provided with reinforcing layers including a radially outermost layer, and it is desirable that the radially outermost layer extends in the tire axial direction so that the axially outer edges thereof are respectively located axially outside axially outermost circumferential grooves.

Therefore, in the tire according to the present invention, the drainage performance in the last stage of tread wear life is ensured by the radially inner second portion of the first circumferential groove. Further, the lateral grooves promote water flow from the first circumferential groove to the second circumferential groove, and improve the drainage performance.

DESCRIPTION OF THE PREFERRED EMBODIMENTS

The present invention can be applied to pneumatic tires for heavy duty vehicles, passenger cars, motorcycles and the like. Further, the present invention may be applied to non-pneumatic tires so-called airless tires.

Hereinafter, taking a pneumatic tire for heavy duty vehicles an example, embodiments of the present invention will be described in detail with reference to the accompanying drawings.

Figure 1:
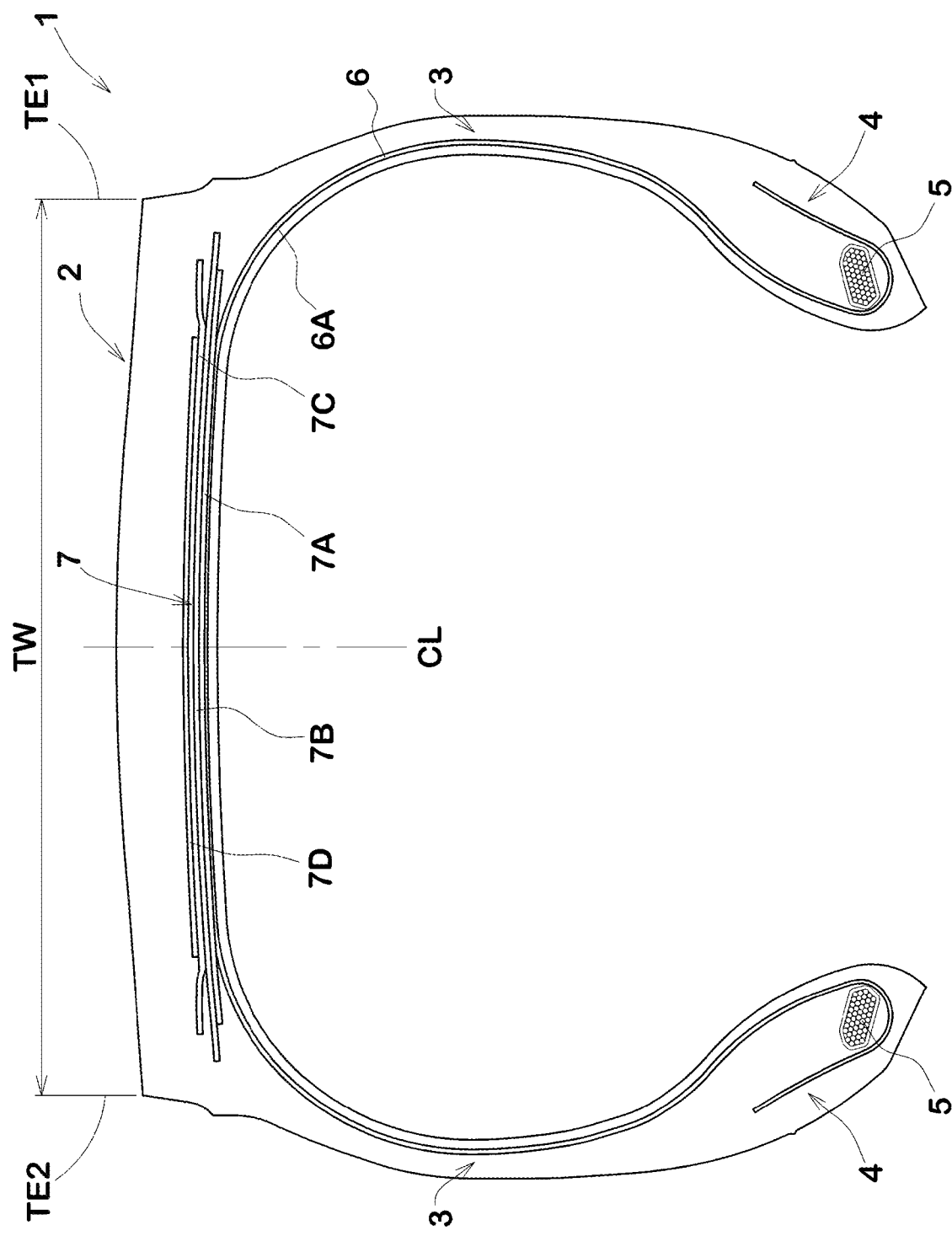
FIG. 1 is a cross-sectional view of a pneumatic tire as an embodiment of the present invention.

FIG. 1 is a cross-sectional partial view of a tire 1 as an embodiment of the present invention taken along the tire equatorial plane including the tire rotation axis (not shown) under a normal state of the tire.

In the case of a pneumatic tire, the normal state of the tire is a normally inflated unloaded state such that the tire is mounted on a standard wheel rim and inflate to a standard pressure but loaded with no tire load.

The undermentioned normally inflated loaded state is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure may be uniformly defined by 180 kPa.

In this application including specification and claims, various dimensions, positions and the like of a pneumatic tire refer to those under the normally inflated unloaded state of the tire unless otherwise noted.

The tread edges TE1 and TE2 are the axial outermost edges of the ground contacting patch of the tire which occurs under the normally inflated loaded state when the camber angle of the tire is zero.

The tread width TW is the width measured under the normally inflated unloaded state, as the axial distance between the tread edges TE1 and TE2 determined as above.

The tire 1 in this embodiment comprises a tread portion 2, a pair of axially spaced bead portions 4 each with a bead core 5 therein, a pair of sidewall portions 3 extending between the tread edges TE1 and TE2 and the bead portions 4, a carcass 6 extending between the bead portions 4, and a tread reinforcing belt 7 disposed radially outside the carcass in the tread portion 2.

The bead core 5 is formed by winding a steel wire into a polygonal cross section, for example.

The carcass 6 is composed of at least one ply 6A of cords rubberized with topping rubber.

As to the carcass cords, for example, steel cords and organic fiber cords such as polyester fibers, nylon fibers, rayon fibers, polyethylene naphthalate fibers, aramid fibers and the like may be employed.

The carcass ply 6A extends between the bead portions 4 through the tread portion 2 and the sidewall portions 3, and is secured to the bead cores 5.

The carcass 6 in this example consists of a single carcass ply 6A, but the carcass 6 may be composed of a plurality of the carcass plies 6A.

The belt 7 is composed of one or more plies, in this example, four plies 7A, 7B, 7C and 7D, each made of parallel cords rubberized with a topping rubber.

For the belt cords of the belt plies 7A, 7B, 7C and 7D, high modulus cords such as steel cords are preferably used.

On the outside in the tire radial direction of the belt 7, a band may be provided. The band is composed of at least one ply of at least one organic fiber cord arranged at a small angle, for example, not more than 10 degrees, with respect to the tire circumferential direction.

The band ply may be of a so-called jointless ply structure formed by spirally winding a rubberized cord or several parallel cords embedded in rubber in a ribbon-shape, or of a spliced ply structure formed by splicing both ends of a strip of rubberized parallel cords.

Figure 2:
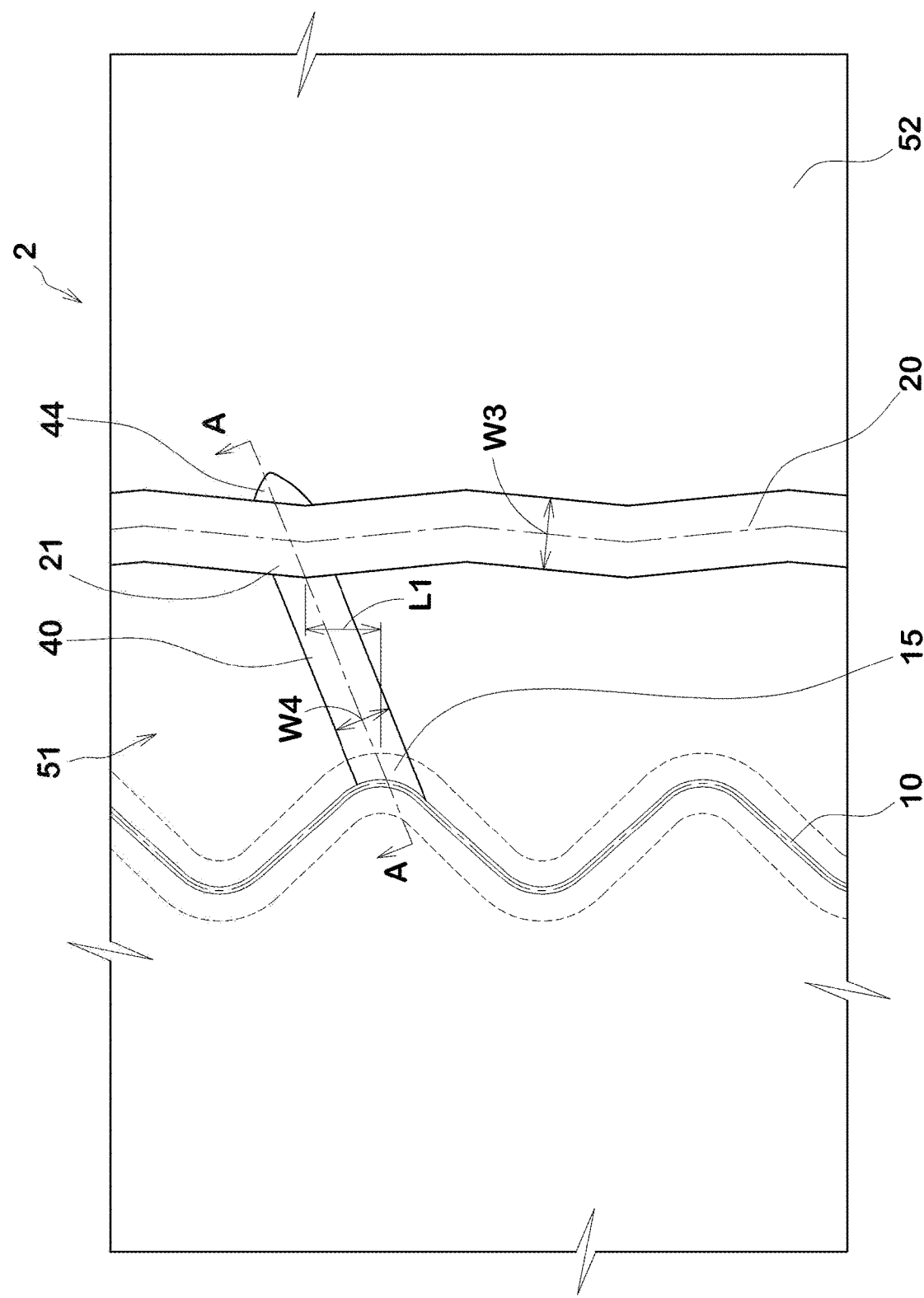
FIG. 2 is a developed partial view showing a tread portion of the tire shown in FIG. 1.

FIG. 2 shows a part of the tread portion 2 of the tire 1 in the present embodiment.

The tread portion 2 is provided with a first circumferential groove 10 and a second circumferential groove 20 each extending circumferentially of the tire, and lateral grooves 40 connecting between the first circumferential groove 10 and the second circumferential groove 20.

The first circumferential groove 10 is a zigzag groove of which widthwise center line extends in the tire circumferential direction in a zigzag manner.

Here, the zigzag groove includes a repeatedly sharply bent groove made up of linear groove segments, and a repeatedly smoothly curved groove, for example like a sine-wave.

Figure 3:
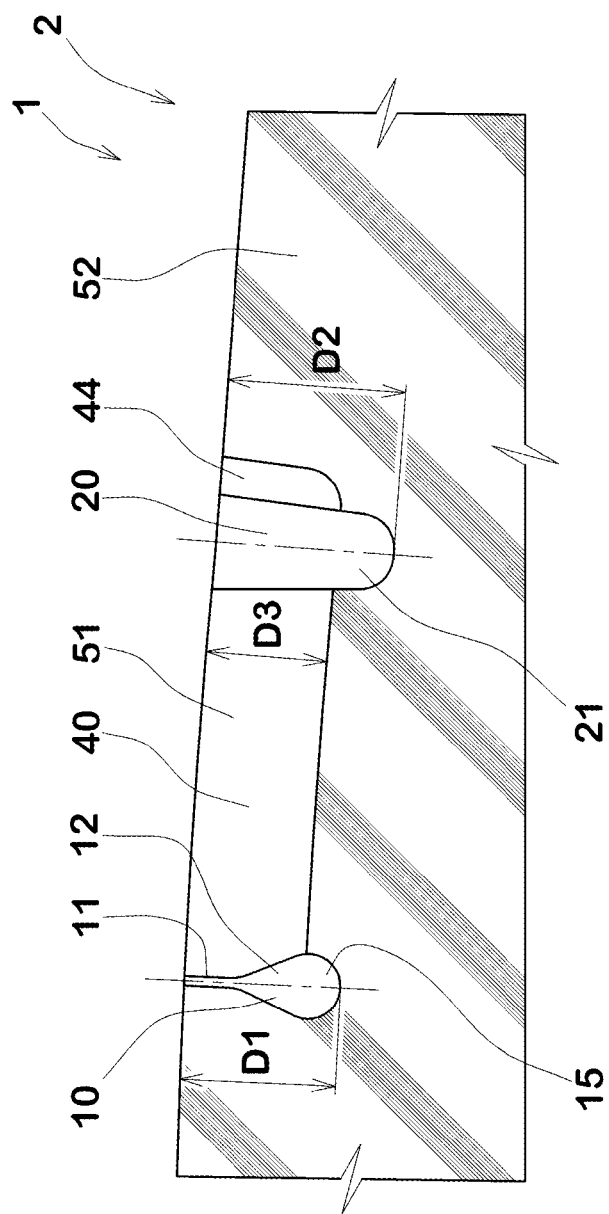
FIG. 3 is a cross-sectional view taken along line A-A in FIG. 2.

FIG. 3 shows a cross section taken along line A-A in FIG. 2. As shown, the first circumferential groove 10 comprises a first portion 11 defined as having the smallest groove width, and a second portion 12 which is larger in the groove width than the first portion 11. The second portion 12 is located inside the first portion 11 in the radial direction of the tire.

In the present embodiment, the first circumferential groove 10 has a cross-sectional shape like a flask shape or teardrop shape. Due to such cross-sectional shape, even when the tread portion 2 is subjected to a large load, the stress applied to the side walls of the land portions, namely, the side walls of the first circumferential groove 10 is relaxed.

The first portion 11 of the present embodiment is opened at the tread surface.

Therefore, in the initial stage of tread wear life, the first circumferential groove 10 appearing in the tread surface is its first portion 11.

The first portion 11 may be closed by the load applied to the tread portion 2, and thereby the rigidity of the tread portion 2 in the tire axial direction is increased.

Since the first portion 11 of the present embodiment extends in the tire circumferential direction in a zigzag shape, the 1 and portions on both sides of the first portion 11 engage with each other, therefore, the rigidity of the tread portion 2 in the tire circumferential direction is also increased.

On the other hand, as the wear of the tread portion 2 progresses, the position of the tread surface moves inward in the radial direction of the tire, and the opening of the first circumferential groove 10 changes from the first portion 11 to the second portion 12.

Since the opening width of the first circumferential groove 10 is increased as the tread wear progresses, the drainage performance is maintained at high levels even in the last stage of tread wear life (for example, the groove depth of the remaining first circumferential groove 10 is 3 mm).

Further, as shown in FIG. 2, the lateral grooves 40 improve the drainage performance of the tread portion 2 and enhances the cornering performance during running in wet conditions.

The first circumferential groove 10 and the second circumferential groove 20 are communicated with each other via the lateral grooves 40. Therefore, the lateral grooves 40 promote water flow from the first circumferential groove 10 to the second circumferential groove 20 to improve the drainage performance of the tread portion 2.

As the first circumferential groove 10 extends zigzag, it has first approximate portions at which the first circumferential groove 10 is closest to the second circumferential groove 20.

It is preferable that the first approximate portions 15 have a depth D1 not more than the depth D2 of the second circumferential groove 20.

By setting the depth D1 equal to or less than the depth D2, the water in the first circumferential groove 10 easily flows into the second circumferential groove 20 through the lateral grooves 40 during running in wet conditions, and the retention of water in the first circumferential groove 10 is suppressed. Therefore, the drainage performance is improved.

Further, the rigidity of the tread portion 2 in the tire axial direction is increased.

Furthermore, the rubber volume of the tread portion 2 is easily secured. As a result, the wear resistance performance of the tire 1 is improved.

It is preferable that the depth D1 of the first approximate portions 15 is not less than 80% of the depth D2 of the second circumferential groove 20.

When the depth D1 is more than 80% of the depth D2, the water flow in the first circumferential groove 10 becomes good, and the drainage performance in the last stage of tread wear life is improved especially.

It is preferable that the depth D3 of the lateral grooves 40 is set in a range from 70% to 90% of the depth D1 of the first approximate portion 15.

When the depth D3 is more than 70% of the depth D1, the water in the first circumferential groove 10 easily flows into the lateral grooves 40, and the retention of water in the first circumferential groove 10 is suppressed, and the drainage performance is improved. In addition, the drainage performance in the last stage of tread wear life is improved.

On the other hand, when the depth D3 is less than 90% of the depth D1, the rigidity of the tread portion 2 in the tire circumferential direction is increased. Further, the rubber volume of the tread portion 2 is easily secured. As a result, the wear resistance performance of the tire 1 is improved.

It is preferable that the lateral grooves 40 are connected to the first approximate portions 15 of the first circumferential groove 10.

Since such flow paths from the first circumferential groove 10 to the second circumferential groove 20 formed by the lateral grooves 40 are shorter, the water in the first circumferential groove 10 easily flows into the second circumferential groove 20 during running in wet conditions, and the drainage performance is improved. Further, the water in the first circumferential groove 10 easily flows into the lateral grooves 40 during running in wet conditions, and the drainage performance is improved.

It is preferable that the second circumferential groove 20 is a zigzag groove of which widthwise center line extends in the tire circumferential direction in a zigzag manner. As a result, the cornering performance during running in wet conditions can be improved.

As the second circumferential groove 20 extends zigzag, it comprises second approximate portions 21 at which the second circumferential groove 20 is closest to the first circumferential groove 10.

It is preferable that the lateral grooves 40 are connected to the second approximate portions 21 of the second circumferential groove 20.

Since such flow paths from the first circumferential groove 10 to the second circumferential groove 20 formed by the lateral grooves 40 becomes shorter, the water in the first circumferential groove 10 easily flows into the second circumferential groove 20 during running in wet conditions, and the drainage performance is improved.

Further, the water in the lateral grooves 40 easily flows into the second circumferential groove 20 during running in wet conditions, and the drainage performance is improved.

It is preferable that the distance L1 in the tire circumferential direction between the adjacent first and second approximate portions 15 and 21 is set in a range from 5 to 20 mm. When the distance L1 is more than 5 mm, the inclination angle of the lateral grooves 40 with respect to the tire axial direction becomes large, and the flow of water existing in the lateral grooves 40 is promoted.

When the distance L1 is less than 20 mm, the rigidity in the tire axial direction of the tread portion 2 is increased.

Further, the rubber volume of the tread portion 2 is easily secured. As a result, the wear resistance performance of the tire 1 is improved.

It is preferable that the lateral grooves 40 extend linearly. As a result, the water flow in the lateral grooves 40 becomes smooth during running in wet conditions.

Further, the length of the lateral groove 40 becomes short, and the water in the first circumferential groove 10 easily flows into the second circumferential groove 20 during running in wet conditions. As a result, the drainage performance is improved.

The tread portion 2 comprises a first land portion 51 on one side of the second circumferential groove 20 which side is the first circumferential groove 10 side, and a second land portion 52 on the other side of the second circumferential groove 20 which side is opposite to the first land portion 51. The first land portion 51 is defined between the first circumferential groove 10 and the second circumferential groove 20.

It is preferable that the lateral grooves 40 extend from the first land portion 51 across the second circumferential groove 20 and terminates within the second land portion 52. That is, in the present embodiment, the lateral grooves 40 each have a portion 44 extended into the second land portion 52. By providing such extended portion 44 into the second land portion 52, the drainage performance in the second land portion 52 is improved.

Figure 4:
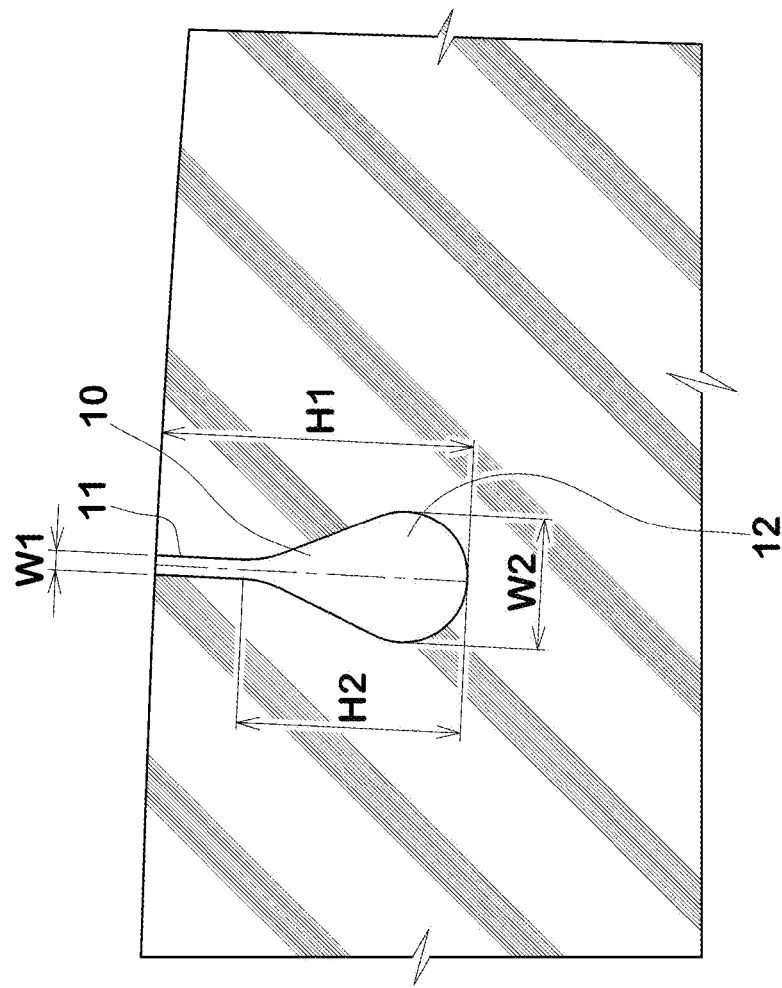
FIG. 4 is a cross-sectional view showing a first circumferential groove.

As shown in FIG. 4, the groove width w1 in the first portion 11 is preferably 1 to 2 mm.

When the width w1 is 1 mm or more, water easily flows from the first portion 11 to the second portion 12 during running in wet conditions, and sufficient drainage performance can be easily ensured.

On the other hand, since the width w1 is 2 mm or less, when a load is applied to the tread portion 2 in the initial stage of tread wear life, the first portion 11 is likely to be closed by the ground contact pressure, and the rigidity of the tread portion 2 in the tire axial direction is increased. Further, the rubber volume of the tread portion 2 is easily secured. As a result, the wear resistance performance of the tire 1 is improved.

The largest groove width w2 occurring in the second portion 12 is preferably set in a range from 2 to 12 mm. When the largest groove width w2 is more than 2 mm, the width of the first circumferential groove 10 can be easily secured even in the last stage of tread wear life, and sufficient drainage performance can be easily secured.

On the other hand, when the largest groove width w2 is less than 12 mm, the rubber volume of the tread portion 2 is easily secured. As a result, the wear resistance performance of the tire 1 is improved.

It is preferable that the largest groove width w2 is set in a range from 2 to 6 times the groove width w1.

Since the width w2 is twice or more of the width w1, the groove width of the first circumferential groove 10 can be easily secured even in the last stage of tread wear life, and sufficient drainage performance can be easily secured.

Since the width w2 is 6 times or less of the width w1, the rubber volume of the tread portion 2 is easily secured. As a result, the wear resistance performance of the tire 1 is improved.

In the first circumferential groove 10 of the present embodiment, it is more preferable that the width w1 is 1 mm or more, the width w2 is 2 mm or more, and the width w2 is twice or more of the width w1.

With such first circumferential groove 10, it is possible to easily secure sufficient drainage performance even in the last stage of tread wear life.

Further, it is desirable that the width w1 is 2 mm or less, the width w2 is 12 mm or less, and the width w2 is 6 times or less the width w1. Thereby, the rubber volume of the tread portion 2 is easily secured by the first circumferential groove 10, and the wear resistance performance of the tire 1 is improved.

It is preferable that the shortest distance H2 in the tire radial direction from the groove bottom of the first circumferential groove 10 to the first portion 11 is set in a range from $1/3$ to $2/3$ times the depth H1 of the first circumferential groove 10, namely, a condition: $1/3 =< H2/H1 =< 2/3$ is satisfied.

When the H2/H1 is $1/3$ or more, the groove volume of the second portion 12 can be easily secured, and sufficient drainage performance in the last stage of tread wear life can be easily secured.

When the H2/H1 is $2/3$ or less, the rigidity of the tread portion 2 in the tire axial direction is increased in the initial stage of tread wear life. Further, the rubber volume of the tread portion 2 is easily secured. As a result, the wear resistance performance of the tire 1 is improved.

In the first circumferential groove 10 of the present embodiment, it is more preferable that the largest groove width w2 is set in a range from 2 to 6 times the groove width w1, and a condition: $1/3 =< H2/H1 =< 2/3$ is satisfied.

When the width w2 is twice or more of the width w1 and the H2/H1 is $1/3$ or more, it is possible to easily secure sufficient drainage performance in the last stage of tread wear life.

When the width w2 is 6 times or less of the width w1 and the H2/H1 is $2/3$ or less, the rubber volume of the tread portion 2 is easily secured, and the wear resistance performance of the tire 1 is improved.

It is preferable that the second circumferential groove 20 has a groove width w3 (shown in FIG. 2) in a range from 2% to 6% of the tread width TW (shown in FIG. 1).

When the width w3 is 2% or more of the tread width TW, the drainage performance is improved.

On the other hand, when the width w3 is 6% or less of the tread width TW, the rubber volume of the tread portion 2 is easily secured. As a result, the wear resistance performance of the tire 1 is improved.

It is preferable that the lateral grooves 40 each have a groove width w4 in a range from 2 to 12 mm.

When the width w4 is 2 mm or more, the flow of water from the first circumferential groove 10 to the second circumferential groove 20 becomes good, and the drainage performance is easily improved.

On the other hand, when the width w4 is 12 mm or less, the rigidity of the tread portion 2 in the tire circumferential direction is increased. Further, the rubber volume of the tread portion 2 is easily secured. As a result, the wear resistance of the tire 1 is improved.

Figure 5:
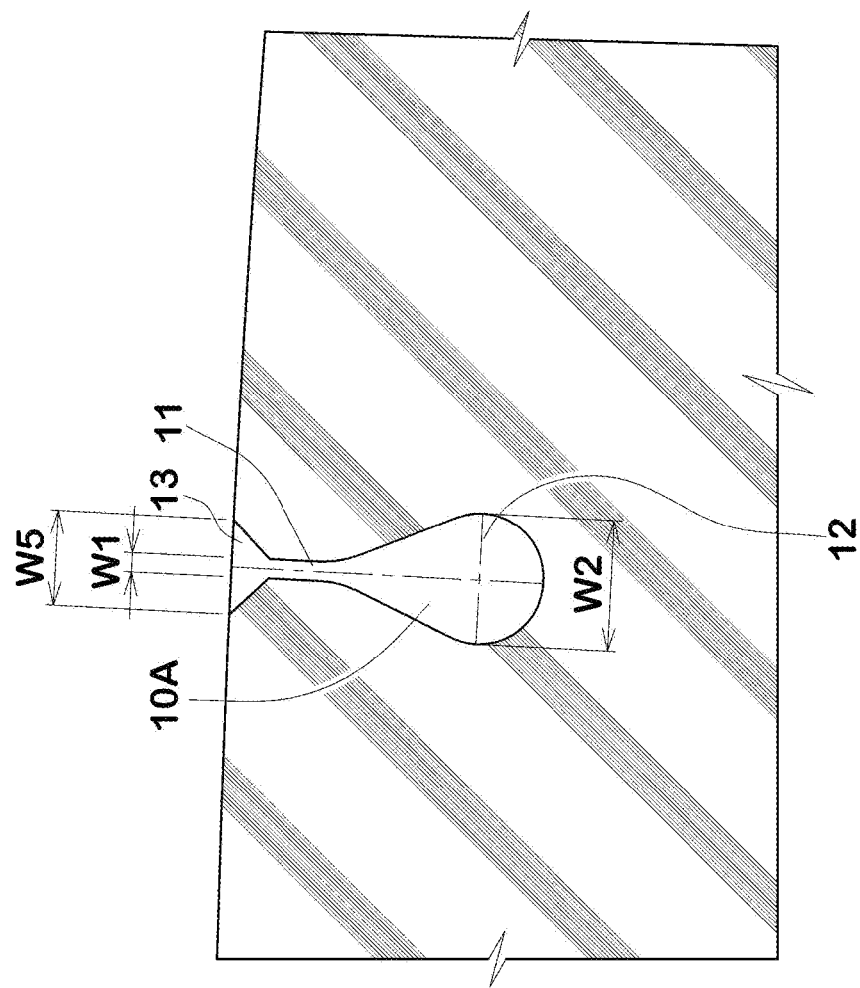
FIG. 5 is a cross-sectional view showing a modified example of the first circumferential groove.

FIG. 5 shows a modified example 10A of the first circumferential groove 10.

The configurations of the first circumferential groove 10 described above can be adopted for portions of the first circumferential groove 10A not described below.

The first circumferential groove 10A comprises a third portion 13 located radially outside the first portion 11.

In the third portion 13, the groove width is gradually increased toward the outside in the tire radial direction.

The third portion 13 increases the volume of the first circumferential groove 10A in the initial stage of tread wear life.

The third portion 13 increases the amount of water flowing from the first portion 11 to the second portion 12. As a result, the drainage performance is improved.

It is preferable that the largest groove width w2 in the second portion 12 is larger than the largest groove width w5 in the third portion 13.

As a result, the groove volume of the first circumferential groove 10A can be easily secured in the second portion 12, and sufficient drainage performance in the last stage of tread wear life can be easily secured.

A set of the first and second circumferential grooves 10 and 20 and the lateral grooves 40 may be formed plurally in the tread portion 2.

Further, the first and second circumferential grooves 10 and 20 and the lateral grooves 40 may be employed in combination with other grooves.

Figure 6:
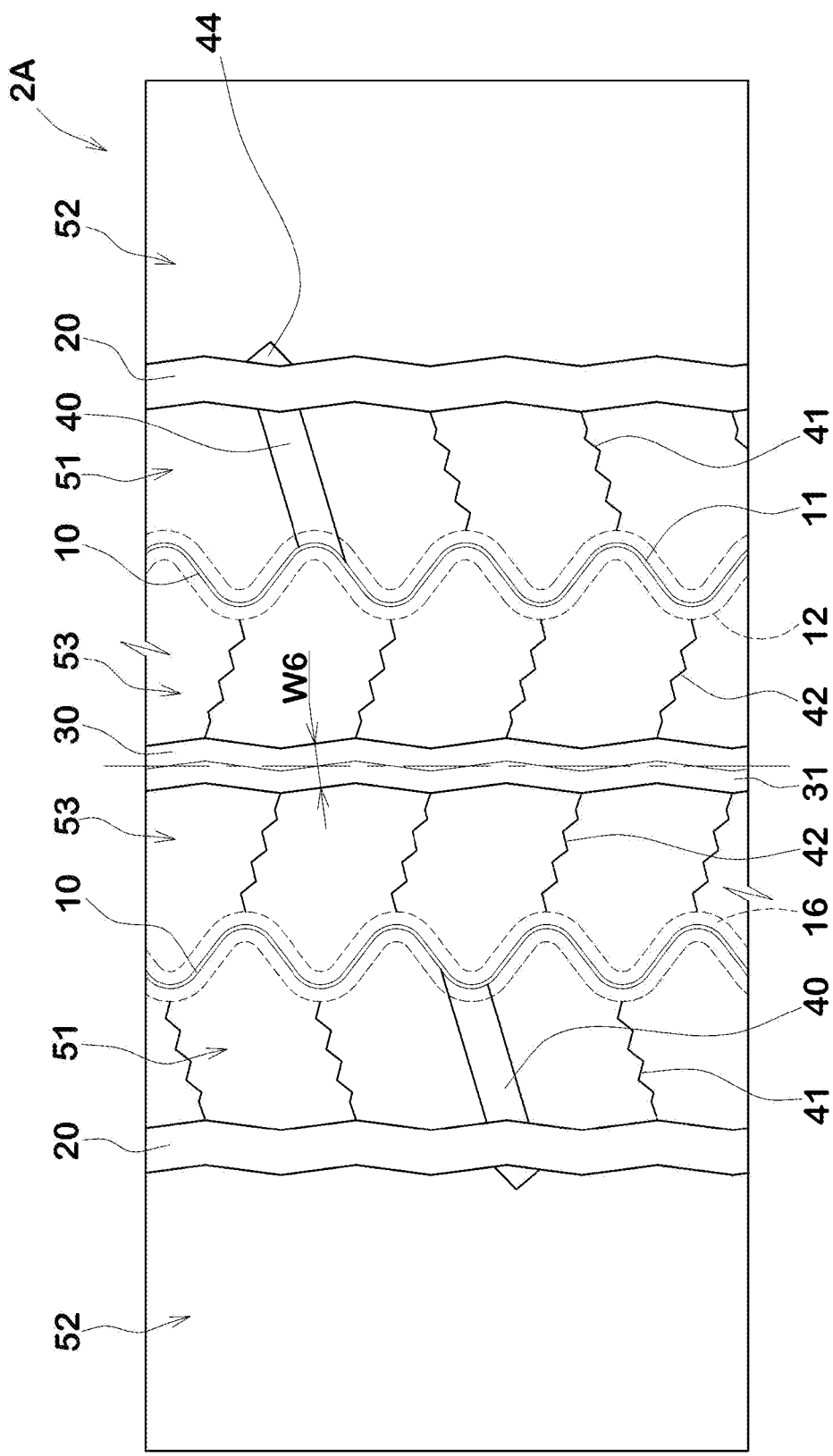
FIG. 6 is a developed partial view showing a modified example of the tread portion shown in FIG. 2.

FIG. 6 shows a tread portion 2A which is a modification of the tread portion 2 shown in FIG. 2.

The above-described configurations of the tread portion 2 may be adopted for portions of the tread portion 2A not described below.

The tread portion 2A is provided, on each side of the tire equator CL, with a pair of the first and second circumferential grooves 10 and 20, and the second circumferential groove 20 is disposed axially outside the first circumferential groove 10.

As a result, the ground contact pressure in the portion around the first circumferential groove 10 becomes higher than the ground contact pressure in the portion around the second circumferential groove 20, so the first portion 11 is likely to be closed in the initial stage of tread wear life, and the rigidity of the tread portion 2 in the tire axial direction is increased.

Further, the tread portion 2A is provided with a third circumferential groove 30 extending in the tire circumferential direction and disposed between the two first circumferential grooves 10.

In this embodiment, the third circumferential groove 30 is located on the tire equator CL. With such third circumferential groove 30, the drainage performance in the crown portion of the tread portion 2A is enhanced.

In this embodiment, the tread portion 2A when not yet worn, functions as a four-rib tread pattern axially divided by the two second circumferential grooves 20 and the one third circumferential groove 30, and the wear resistance performance is improved.

On the other hand, in the last stage of tread wear life, the tread portion 2A functions as a six-rib tread pattern axially divided by the two first circumferential grooves 10, the two second circumferential grooves and the one third circumferential groove 30, and the drainage performance during running in wet conditions is improved.

It is preferable that the groove width w6 of the third circumferential groove 30 is set in a range from 2% to 6% of the tread width TW.

When the groove width w6 is 2% or more of the tread width TW, the drainage performance of the tread portion 2 is enhanced.

On the other hand, when the width w6 is 6% or less of the tread width TW, the rubber volume of the tread portion 2 is easily secured. As a result, the wear resistance performance of the tire 1 is improved.

Each of the first land portions 51 is provided with first sipes 41 extending from the first circumferential groove 10 to the second circumferential groove 20.

The first sipe 41 is a narrow groove having a groove width of 2.0 mm or less, which is closed by the ground contact pressure of the tire 1.

The first sipes 41 exert an edge effect and enhances traction performance during running in wet conditions.

In the present embodiment, the first sipes 41 each extend in a zigzag shape, therefore, when the first sipe 41 is closed and the opposite sipe walls are engaged with each other, the rigidity of the first land portion 51 is increased.

Figure 7:
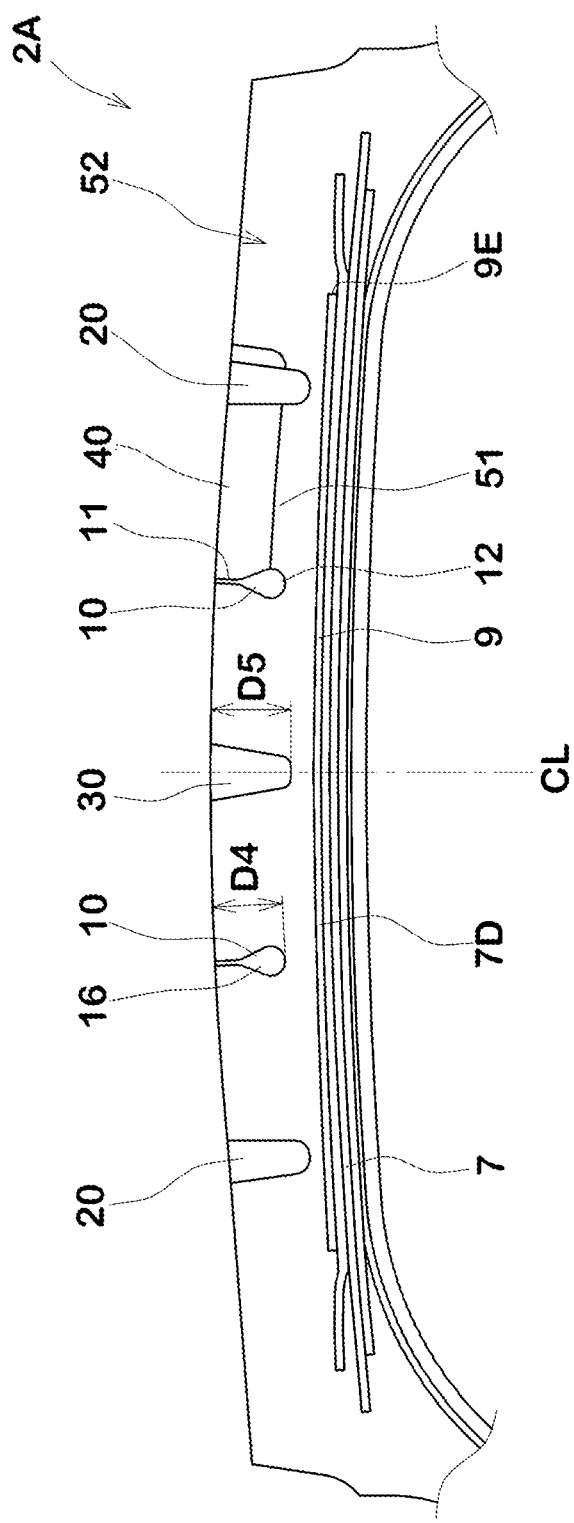
FIG. 7 is a cross-sectional view of the tread portion shown in FIG. 6.

FIG. 7 shows a cross section of the tread portion 2A. It is preferable that the depth D5 of the third circumferential groove 30 is larger than the depth D4 of the third approximate portions 16. By setting the depth D5 larger than the depth D4, the drainage performance of the tread portion 2 is enhanced.

The third land portion 53, which is defined between the third circumferential groove 30 and each of the first circumferential grooves 10, is provided with second sipes 42 extending from the third circumferential groove 30 to the first circumferential groove 10.

The second sipe 42 is a narrow groove having a width of 2.0 mm or less, which is closed by the ground contact pressure of the tire 1.

The second sipes 42 exert an edge effect and enhances traction performance during running in wet conditions.

In the present embodiment, the second sipes 42 each extend zigzag, therefore, when the second sipe 42 is closed and the opposite sipe walls are engaged with each other, the rigidity of the third land portion 53 is increased.

The third circumferential groove 30 extends zigzag, therefore, it has fourth approximate portions 31 at which the third circumferential groove 30 is closest to the first circumferential groove 10.

It is preferable that the second sipes 42 are connected to the respective fourth approximate portions 31.

As the first circumferential groove 10 extends zigzag, it has third approximate portions 16 at which the first circumferential groove 10 is closest to the third circumferential groove 30.

It is preferable that the second sipes 42 are connected to the respective third approximate portions 16. As a result, the second sipes 42 become short, and the rigidity of the third land portion 53 is increased.

The tread portion 2A is provided with a plurality of reinforcing layers 9 stacked in the tire radial direction. In the case of the tire 1 provided with only the belt 7, the belt plies 7A, 7B, 7C and 7D constituting the belt 7 correspond to the reinforcing layers 9.

In the case of the tire 1 provided with the belt 7 and a band layer disposed on the radially outer side of the belt 7, the belt plies and the band layer correspond to the reinforcing layers 9.

In the tread portion 2A, it is desirable that axially outer edges 9E of the radially outermost layer of the reinforcing layers 9 (in the present embodiment, the radially outermost belt ply 7D) are located axially outside the respective first circumferential grooves 10.

By extending the radially outermost reinforcing layer 9 to the axially outer sides of the first circumferential grooves 10, the rigidity of the tread portion 2 is increased, and as a result, the drainage performance is improved, and the cornering performance during running in wet conditions is improved.

In the tread portion 2A, it is desirable that axially outermost edges 9E of the reinforcing layers 9 are located axially outer sides of the respective axially outermost circumferential grooves (in the present embodiment, the second circumferential grooves 20).

By extending the reinforcing layers 9 to the axially outer sides of the second circumferential grooves 20, the rigidity of the tread portion 2 is further increased. As a result, the drainage performance is further improved, and the cornering performance during running in wet conditions is enhanced.

Figure 8:
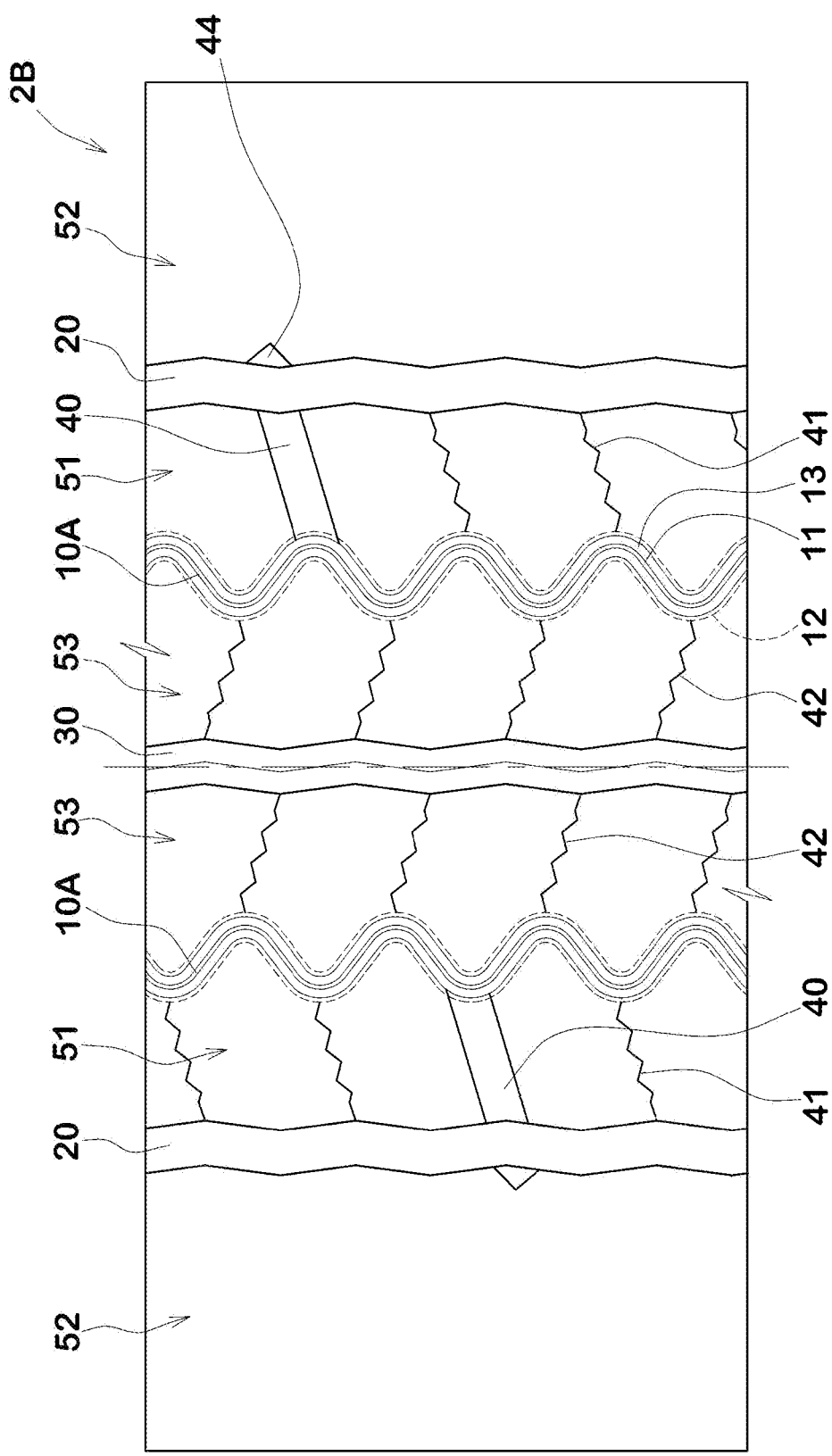
FIG. 8 is a developed partial view showing a modified example of the tread portion shown in FIG. 6.
Figure 9:
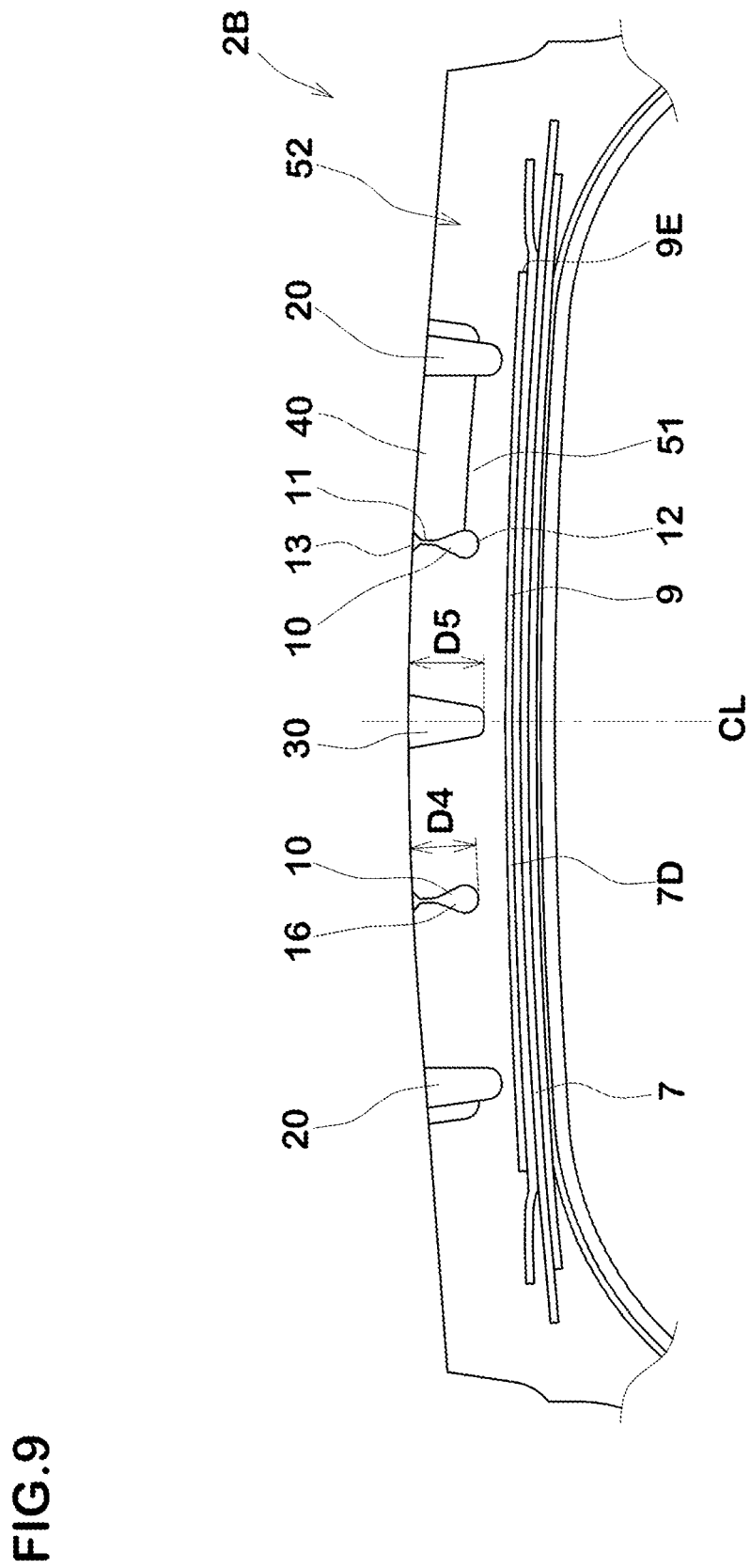
FIG. 9 is a cross-sectional view of the tread portion shown in FIG. 8.

FIGS. 8 and 9 show a tread portion 2B which is a modification of the tread portion 2A shown in FIGS. 6 and 7. The above-described configurations of the tread portion 2A can be adopted for portions of the tread portion 2B not described below.

The tread portion 2B is provided, on each side of the tire equator, with a pair of the above-described first circumferential groove 10A and the second circumferential groove 20. As shown in FIG. 5, the first circumferential groove 10A comprises the third portion 13 radially outside the first portion 11.

The groove width in the third portion 13 gradually increases toward the outside in the radial direction of the tire. Thus, the third portion 13 enhances the drainage performance of the first circumferential groove 10A in the initial stage of tread wear life.

While detailed description has been made of preferable embodiments of the present invention, the present invention can be embodied in various forms without being limited to the illustrated embodiments.

Comparison Tests

Based on the tread pattern shown in FIG. 2, pneumatic tires of size 315/70R22.5 were experimentally manufactured and tested for wet performance in the initial stage and the last stage of tread wear life.

In order to reproduce the tread portion in the last stage of tread wear life, the tread rubber was removed by buffing the tread surface so that the groove depth of the second circumferential groove became 3 mm.

Specifications of the test tires are listed in Table 1. Specifications not listed in Table 1 are common to all the test tires. The test methods are as follows.

<Wet Performance>

The respective test tires were mounted on all wheels of a test vehicle. Using the test vehicle, a wet performance test was carried out under the tire load of 75% of the standard load. In the test, twenty test drivers ran the test car on a wet road surface of a tire test course covered with about 0.5 to 2.0 mm depth water, and each test driver evaluated the cornering performance into five ranks.

For each test tire, the total value of the rank numbers evaluated by the twenty test drivers was calculated.

The calculated total values of the respective test tires are indicated in Table 1 by an index based on comparative example tire 1 being 100 and rounded so as to become a multiple of 5, wherein the larger the value, the better, the wet performance. Specifically, if the number below the first place of the total value was 0.0 or more and less than 2.5, it was rounded down to 0, if 2.5 or more and less than 7.5, it was rounded to 5, and if 7.5 or more, it was rounded up to 0.

TABLE 1

| Tire | comparative example 1 | comparative example 2 | working example 1 |
|---|---|---|---|
| first circumferential groove (zigzag) | present | present | present |
| first portion | present | present | present |
| second portion | absent | present | present |
| second circumferential groove | present | present | present |
| lateral grooves | present | No | present |
| wet performance (rating) | | | |
| new tire condition | 100 | 90 | 110 |
| wear life last stage | 100 | 100 | 110 |

As is clear from Table 1, it was confirmed that the working example tires were significantly improved in the wet performance as compared with the comparative example tires.

Based on the basic pattern shown in FIG. 2, pneumatic tires of size 315/70R22.5 were experimentally manufactured, and tested for wet performance and wear resistance in the last stage of tread wear life.

Specifications of the test tires are listed in Table 2.

Specifications not listed in Table 2 were common to all the test tires. The test methods were as follows.

<Wet Performance>

In the same manner as explained above, wet performance test was carried out on each test tire.

The results are indicated in Table 2 by an index based on working example tire 4 being 100 and rounded so as to become a multiple of 5, wherein the larger the value, the better the wet performance.

<Wear Resistance>

The amount of wear of each test tire was measured after running for a predetermined distance using the above-mentioned test vehicle.

The results are indicated in Table 2 by an index based on working example tire 4 being 100 and rounded so as to become a multiple of 5, wherein the larger the value, the better the wear resistance.

TABLE 2

| Tire | working example 2 | working example 3 | working example 4 | working example 5 | working example 6 |
|---|---|---|---|---|---|
| first circumferential groove (zigzag) | present | present | present | present | present |
| first portion | present | present | present | present | present |
| second portion | present | present | present | present | present |
| second circumferential groove | present | present | present | present | present |
| lateral grooves | present | present | present | present | present |
| D1/D2 (%) | 70 | 80 | 90 | 100 | 110 |
| wet performance (rating) | | | | | |
| wear life last stage | 90 | 95 | 100 | 105 | 110 |
| wear resistance (index) | 110 | 105 | 100 | 95 | 90 |

Based on the basic pattern shown in FIG. 2, pneumatic tires of size 315/70R22.5 were experimentally manufactured and tested for wet performance and wear resistance in the last stage of tread wear life.

Specifications of the test tires are listed in Table 3.

Specifications not listed in Table 3 were common to all the test tires.

The test methods are as follows.

<Wet Performance>

In the same manner as explained above, wet performance test was carried out on each test tire.

The results are indicated in Table 3 by an index based on working example tire 9 being 100 and rounded so as to become a multiple of 5, wherein the larger the value, the better the wet performance.

<Wear Resistance>

In the same manner as explained above, the amount of wear of each test tire was measured.

The results are indicated in Table 3 by an index based on working example tire 9 being 100 and rounded so as to become a multiple of 5, wherein the larger the value, the better the wear resistance.

TABLE 3

| Tire | working example 7 | working example 8 | working example 9 | working example 10 | working example 11 |
|---|---|---|---|---|---|
| first circumferential groove (zigzag) | present | present | present | present | present |
| first portion | present | present | present | present | present |
| second portion | present | present | present | present | present |
| second circumferential groove | present | present | present | present | present |
| lateral grooves | present | present | present | present | present |
| D3/D1 (%) | 65 | 70 | 80 | 90 | 95 |
| wet performance (rating) | | | | | |
| wear life last stage | 90 | 95 | 100 | 105 | 110 |
| wear resistance (index) | 110 | 105 | 100 | 95 | 90 |

Based on the basic pattern shown in FIG. 2, pneumatic tires of size 315/70R22.5 were experimentally manufactured and tested for wet performance in the last stage of tread wear life.

Specifications of the test tires are listed in Table 4.

Specifications not listed in Table 4 were common to all the test tires. The test methods are as follows.

<Wet Performance>

In the same manner as explained above, wet performance test was carried out on each test tire.

The results are indicated in Table 4 by an index based on working example tire 12 being 100 and rounded so as to become a multiple of 5, wherein the larger the value, the better the wet performance.

TABLE 4

| Tire | working example 12 | working example 13 |
|---|---|---|
| first circumferential groove (zigzag) | present | present |
| first portion | present | present |
| second portion | present | present |
| second circumferential groove | present | present |
| lateral grooves | present | present |
| lateral grooves were connected to | first approximate portions of first circumferential groove | second approximate portions of first circumferential groove |
| wet performance (rating) | | |
| wear life last stage | 100 | 95 |

Based on the basic pattern shown in FIG. 2, pneumatic tires of size 315/70R22.5 were experimentally manufactured and tested for wet performance in the last stage of tread wear life.
Specifications of the test tires are listed in Table 5.
Specifications not listed in Table 5 were common to all the test tires. The test methods are as follows.
<Wet Performance>
In the same manner as explained above, wet performance test was carried out on each test tire.
The results are indicated in Table 5 by an index based on working example tire 14 being 100 and rounded so as to become a multiple of 5, wherein the larger the value, the better the wet performance.

TABLE 5

| Tire | working example 14 | working example 15 |
|---|---|---|
| first circumferential groove (zigzag) | present | present |
| first portion | present | present |
| second portion | present | present |
| second circumferential groove (zigzag) | present | present |
| lateral grooves | present | present |
| lateral were connected to | second approximate portions of second circumferential groove | first approximate portions of second circumferential groove |
| wet performance (rating) | | |
| wear life last stage | 100 | 95 |

Based on the basic pattern shown in FIG. 2, pneumatic tires of size 315/70R22.5 were experimentally manufactured and tested for wet performance in new condition and wear resistance.
Specifications of the test tires are listed in Table 6.
Specifications not listed in Table 6 were common to all the test tires. The test methods are as follows.
<Wet Performance>
In the same manner as explained above, wet performance test was carried out on each test tire.
The results are indicated in Table 6 by an index based on working example tire 16 being 100 and rounded so as to become a multiple of 5, wherein the larger the value, the better the wet performance.

<Wear Resistance>
In the same manner as explained above, the amount of wear of each test tire was measured.
The results are indicated in Table 6 by an index based on working example tire 16 being 100 and rounded so as to become a multiple of 5, wherein the larger the value, the better the wear resistance.

TABLE 6

| Tire | working example 18 | working example 19 | working example 20 | working example 21 | working example 22 |
|---|---|---|---|---|---|
| first circumferential groove (zigzag) | present | present | present | present | present |
| first portion | present | present | present | present | present |
| second portion | present | present | present | present | present |
| second circumferential groove | present | present | present | present | present |
| lateral grooves | present | present | present | present | present |
| W1 (mm) | 0.5 | 1 | 1.5 | 2 | 3 |
| wet performance (rating) | | | | | |
| new tire condition | 90 | 95 | 100 | 105 | 110 |
| wear resistance (index) | 110 | 105 | 100 | 95 | 90 |

Based on the basic pattern shown in FIG. 2, pneumatic tires of size 315/70R22.5 were experimentally manufactured and tested for wet performance in new condition and wear resistance.
Specifications of the test tires are listed in Table 7.
Specifications not listed in Table 7 were common to all the test tires. The test methods are as follows.
<Wet Performance>
In the same manner as explained above, wet performance test was carried out on each test tire.
The results are indicated in Table 7 by an index based on working example tire 20 being 100 and rounded so as to become a multiple of 5, wherein the larger the value, the better the wet performance.
<Wear Resistance>
In the same manner as explained above, the amount of wear of each test tire was measured.
The results are indicated in Table 7 by an index based on working example tire 20 being 100 and rounded so as to become a multiple of 5, wherein the larger the value, the better the wear resistance.

TABLE 7

| Tire | working example 23 | working example 24 | working example 25 | working example 26 | working example 27 |
|---|---|---|---|---|---|
| first circumferential groove (zigzag) | present | present | present | present | present |
| first portion | present | present | present | present | present |
| second portion | present | present | present | present | present |
| second circumferential groove | present | present | present | present | present |
| lateral grooves | present | present | present | present | present |
| W2 (mm) | 1 | 2 | 7 | 12 | 15 |
| wet performance (rating) | | | | | |
| wear life last stage | 80 | 90 | 100 | 110 | 120 |
| wear resistance (index) | 120 | 110 | 100 | 90 | 80 |

Based on the basic pattern shown in FIG. 2, pneumatic tires of size 315/70R22.5 were experimentally manufactured and tested for wet performance in the last stage of tread wear life and wear resistance.
Specifications of the test tires are listed in Table 8.
Specifications not listed in Table 8 were common to all the test tires. The test methods are as follows.
<Wet Performance>
In the same manner as explained above, wet performance test was carried out on each test tire.
The results are indicated in Table 8 by an index based on working example tire 25 being 100 and rounded so as to become a multiple of 5, wherein the larger the value, the better the wet performance.
<Wear Resistance>
In the same manner as explained above, the amount of wear of each test tire was measured.
The results are indicated in Table 6 by an index based on working example tire 25 being 100 and rounded so as to become a multiple of 5, wherein the larger the value, the better the wear resistance.

TABLE 8

| Tire | working example 28 | working example 29 | working example 30 | working example 31 | working example 32 |
|---|---|---|---|---|---|
| first circumferential groove (zigzag) | present | present | present | present | present |
| first portion | present | present | present | present | present |
| second portion | present | present | present | present | present |
| second circumferential groove | present | present | present | present | present |
| lateral grooves | present | present | present | present | present |
| W2/W1 | 1.5 | 2 | 4 | 6 | 8 |
| wet performance (rating) | | | | | |
| wear life last stage | 80 | 90 | 100 | 110 | 120 |
| wear resistance(index) | 120 | 110 | 100 | 90 | 80 |

Based on the basic pattern shown in FIG. 2, pneumatic tires of size 315/70R22.5 were experimentally manufactured and tested for wet performance in the last stage of tread wear life and wear resistance.
Specifications of the test tires are listed in Table 9.
Specifications not listed in Table 9 were common to all the test tires. The test methods are as follows.
<Wet Performance>
In the same manner as explained above, wet performance test was carried out on each test tire.
The results are indicated in Table 9 by an index based on working example tire 30 being 100 and rounded so as to become a multiple of 5, wherein the larger the value, the better the wet performance.
<Wear Resistance>
In the same manner as explained above, the amount of wear of each test tire was measured.
The results are indicated in Table 9 by an index based on working example tire 30 being 100 and rounded so as to become a multiple of 5, wherein the larger the value, the better the wear resistance.

TABLE 9

| Tire | working example 33 | working example 34 | working example 35 | working example 36 | working example 37 |
|---|---|---|---|---|---|
| first circumferential groove (zigzag) | present | present | present | present | present |
| first portion | present | present | present | present | present |
| second portion | present | present | present | present | present |
| second circumferential groove | present | present | present | present | present |
| lateral grooves | present | present | present | present | present |
| H2/H1 | 1/6 | 1/3 | 1/2 | 2/3 | 5/6 |
| wet performance (rating) | | | | | |
| wear life last stage | 80 | 90 | 100 | 110 | 120 |
| wear resistance (index) | 120 | 110 | 100 | 90 | 80 |

Based on the basic pattern shown in FIG. 2, pneumatic tires of size 315/70R22.5 were experimentally manufactured and tested for wet performance in the last stage of tread wear life and wear resistance.
Specifications of the test tires are listed in Table 10.
Specifications not listed in Table 10 were common to all the test tires. The test methods are as follows.
<Wet Performance>
In the same manner as explained above, wet performance test was carried out on each test tire.
The results are indicated in Table 10 by an index based on working example tire 35 being 100 and rounded so as to become a multiple of 5, wherein the larger the value, the better the wet performance.
<Wear Resistance>
In the same manner as explained above, the amount of wear of each test tire was measured.
The results are indicated in Table 10 by an index based on working example tire 35 being 100 and rounded so as to become a multiple of 5, wherein the larger the value, the better the wear resistance.

TABLE 10

| Tire | working example 38 | working example 39 | working example 40 | working example 41 | working example 42 |
|---|---|---|---|---|---|
| first circumferential groove (zigzag) | present | present | present | present | present |
| first portion | present | present | present | present | present |
| second portion | present | present | present | present | present |
| second circumferential groove (zigzag) | present | present | present | present | present |

TABLE 10-continued

| Tire | working example 38 | working example 39 | working example 40 | working example 41 | working example 42 |
|---|---|---|---|---|---|
| lateral grooves | present | present | present | present | present |
| lateral grooves were connected to | first approximate portions of first circumferential groove | first approximate portions of first circumferential groove | first approximate portions of first circumferential groove | first approximate portions of first circumferential groove | first approximate portions of first circumferential groove |
| lateral grooves were connected to | second approximate portions of second circumferential groove | second approximate portions of second circumferential groove | second approximate portions of second circumferential groove | second approximate portions of second circumferential groove | second approximate portions of second circumferential groove |
| L1 (mm) | 0 | 5 | 12 | 20 | 30 |
| wet performance (rating) | | | | | |
| wear life last stage | 80 | 90 | 100 | 110 | 120 |
| wear resistance (index) | 120 | 110 | 100 | 90 | 80 |

Based on the basic pattern shown in FIG. 2, pneumatic tires of size 315/70R22.5 were experimentally manufactured and tested for wet performance in the last stage of tread wear life and wear resistance.
Specifications of the test tires are listed in Table 11.
Specifications not listed in Table 11 were common to all the test tires. The test methods are as follows.
<Wet Performance>
In the same manner as explained above, wet performance test was carried out on each test tire.
The results are indicated in Table 11 by an index based on working example tire 40 being 100 and rounded so as to become a multiple of 5, wherein the larger the value, the better the wet performance.
<Wear Resistance>
In the same manner as explained above, the amount of wear of each test tire was measured.
The results are indicated in Table 6 by an index based on working example tire 40 being 100 and rounded so as to become a multiple of 5, wherein the larger the value, the better the wear resistance.

TABLE 11

| Tire | working example 43 | working example 44 | working example 45 | working example 46 | working example 47 |
|---|---|---|---|---|---|
| first circumferential groove (zigzag) | present | present | present | present | present |
| first portion | present | present | present | present | present |
| second portion | present | present | present | present | present |
| second circumferential groove | present | present | present | present | present |
| lateral grooves | present | present | present | present | present |
| W1 (mm) | 0.5 | 1 | 1.5 | 2 | 2.5 |
| W2 (mm) | 0.8 | 2 | 7 | 12 | 20 |
| W2/W1 | 1.6 | 2 | 4 | 6 | 8 |
| wet performance (rating) | | | | | |
| wear life last stage | 85 | 90 | 100 | 110 | 115 |
| wear resistance (index) | 115 | 110 | 100 | 90 | 85 |

Based on the basic pattern shown in FIG. 2, pneumatic tires of size 315/70R22.5 were experimentally manufactured and tested for wet performance in the last stage of tread wear life and wear resistance.
Specifications of the test tires are listed in Table 12.
Specifications not listed in Table 12 were common to all the test tires.

The test methods are as follows.
<Wet Performance>
In the same manner as explained above, wet performance test was carried out on each test tire.
The results are indicated in Table 12 by an index based on working example tire 45 being 100 and rounded so as to become a multiple of 5, wherein the larger the value, the better the wet performance.
<Wear Resistance>
In the same manner as explained above, the amount of wear of each test tire was measured.
The results are indicated in Table 12 by an index based on working example tire 45 being 100 and rounded so as to become a multiple of 5, wherein the larger the value, the better the wear resistance.

TABLE 12

| Tire | working example 48 | working example 49 | working example 50 | working example 51 | working example 52 |
|---|---|---|---|---|---|
| first circumferential groove (zigzag) | present | present | present | present | present |
| first portion | present | present | present | present | present |
| second portion | present | present | present | present | present |
| second circumferential groove | present | present | present | present | present |
| lateral grooves | present | present | present | present | present |
| W2/W1 | 1.5 | 1.5 | 2 | 2 | 4 |
| H2/H1 | 1/6 | 1/3 | 1/6 | 1/3 | 1/2 |
| wet performance (rating) | | | | | |
| wear life last stage | 70 | 75 | 75 | 80 | 100 |
| wear resistance (index) | 130 | 125 | 125 | 120 | 100 |

Based on the basic pattern shown in FIG. 2, pneumatic tires of size 315/70R22.5 were experimentally manufactured and tested for wet performance in the last stage of tread wear life and wear resistance.
Specifications of the test tires are listed in Table 13.
Specifications not listed in Table 13 were common to all the test tires. The test methods are as follows.
<Wet Performance>
In the same manner as explained above, wet performance test was carried out on each test tire.
The results are indicated in Table 13 by an index based on working example tire 52 being 100 and rounded so as to become a multiple of 5, wherein the larger the value, the better the wet performance.

<Wear Resistance>
In the same manner as explained above, the amount of wear of each test tire was measured.
The results are indicated in Table 13 by an index based on working example tire 52 being 100 and rounded so as to become a multiple of 5, wherein the larger the value, the better the wear resistance.

TABLE 13

| Tire | working example 53 | working example 54 | working example 55 | working example 56 |
|---|---|---|---|---|
| first circumferential groove (zigzag) | present | present | present | present |
| first portion | present | present | present | present |
| second portion | present | present | present | present |
| second circumferential groove | present | present | present | present |
| lateral grooves | present | present | present | present |
| W2/W1 | 6 | 6 | 8 | 8 |
| H2/H1 | 2/3 | 5/6 | 2/3 | 5/6 |
| wet performance (rating) | | | | |
| wear life last stage | 120 | 125 | 125 | 130 |
| wear resistance (index) | 80 | 75 | 75 | 70 |

DESCRIPTION OF THE REFERENCE SIGNS

1 tire
2 tread portion
9 reinforcing layer
9E outer edge
10 first circumferential groove
11 first portion
12 second portion
13 third portion
15 first approximate portion
20 second circumferential groove
21 second approximate portion
30 third circumferential direction groove
40 lateral groove
41 first sipe
42 second sipe
51 first land portion
52 second land portion
CL tire equator
D1 depth
D2 depth
D3 depth

The invention claimed is:

1. A tire comprising:
a tread portion provided with two first circumferential grooves and two second circumferential grooves all extending in a tire circumferential direction,
one of the two first circumferential grooves and one of the two second circumferential grooves are provided on one side of a tire equator, and the other of the two first circumferential grooves and the other of the two second circumferential grooves are provided on the other side of the tire equator,
first lateral grooves connecting between the one of the two first circumferential grooves and the one of the two second circumferential grooves and second lateral grooves connecting between the other of the two first circumferential grooves and the other of the two second circumferential grooves, wherein
each of the two first circumferential grooves comprises a radially outer first portion having a groove width, and a radially inner second portion which is positioned inside the radially outer first portion in a tire radial direction and having a groove width which is wider than the groove width of the radially outer first portion, wherein
the one of the two first circumferential grooves is a zigzag groove and comprises first approximate portions at which the one of the two first circumferential grooves is closest to the one of the two second circumferential grooves, and the other of the two first circumferential grooves is a zigzag groove and comprises other first approximate portions at which the other of the two first circumferential grooves is closest to the other of the two second circumferential grooves,
a depth of each of the first approximate portions is less than a depth of the one of the two second circumferential grooves,
a depth of each of the other first approximate portions is less than a depth of the other of the two second circumferential grooves,
each of the first lateral grooves is connected to a corresponding one of the first approximate portions,
each of the second lateral grooves is connected to a corresponding one of the other first approximate portions,
a depth of each of the first lateral grooves is 70% to 90% of the depth of the first approximate portions,
a depth of each of the second lateral grooves is 70% to 90% of the depth of the other first approximate portions, wherein
the one of the two second circumferential grooves is a zigzag groove and is disposed axially outward of the one of the two first circumferential grooves,
the other of the two second circumferential grooves is a zigzag groove and is disposed axially outward of the other of the two first circumferential grooves, and
a third circumferential a zigzag groove and is disposed between the two first circumferential grooves.

2. The tire according to claim 1, wherein
the tread portion is further provided with first sipes extending from the one of the two first circumferential grooves to the one of the two second circumferential grooves and other first sipes extending from the other of the two first circumferential grooves to the other of the two second circumferential grooves.

3. The tire according to claim 2, wherein
the tread portion is further provided with second sipes extending from the third circumferential groove to the one of the two first circumferential grooves and other second sipes extending from the third circumferential groove to the other of the two first circumferential grooves.

4. The tire according to claim 3, wherein
the one of the two second circumferential grooves extend zigzag so as to have second approximate portions closest to the one of the two first circumferential grooves and the other of the two second circumferential grooves extend zigzag so as to have other second approximate portions closest to the other of the two first circumferential grooves,
the one of the two first circumferential grooves extend zigzag so as to have third approximate portions closest to the third circumferential groove,
the other of the two first circumferential grooves extend zigzag so as to have other third approximate portions closest to the third circumferential groove, the third circumferential groove extends zigzag so as to have fourth approximate portions closest to the one of the two first circumferential grooves and other fourth approximate portions closest to the other of the two first circumferential grooves, the first sipes extend between the first approximate portions and the second approximate portions and the other first sipes extend between the other first approximate portions and the other second approximate portions, and the second sipes extend between the third approximate portions and the fourth approximate portions and the other second sipes extend between the other third approximate portions and the other fourth approximate portions.

5. The tire according to claim 4, wherein
each of the first sipes and each of the other first sipes is a zigzag sipe, and each of the second sipes and each of the other second sipes is a zigzag sipe.

6. The tire according to claim 1, wherein
the tread portion is further provided with reinforcing layers including a radially outermost layer,
the radially outermost layer extends in the tire axial direction so that the axially outer edges of the radially outermost layer are respectively located axially outside the two first circumferential grooves.

7. The tire according to claim 1, wherein
each of the two first circumferential grooves extend zigzag while curving smoothly, and
a zigzag amplitude of each of the two first circumferential grooves is larger than zigzag amplitudes of each of the two second circumferential grooves and the third circumferential groove.

8. The tire according to claim 7, wherein
the one of the two second circumferential grooves comprise second approximate portions closest to the one of the two first circumferential grooves,
the other of the two second circumferential grooves comprise other second approximate portions closest to the other of the two first circumferential grooves,
each of the first lateral grooves is connected to a corresponding one of the second approximate portions,
and each of the second lateral grooves is connected to a corresponding one of the other second approximate portions.

9. The tire according to claim 8, wherein
the tread portion further comprises:
a first land portion disposed on one side of the one of the two second circumferential grooves between the one of the two second circumferential grooves and the one of the two first circumferential grooves,
a second land portion disposed on the other side of the one of the two second circumferential grooves;

another first land portion disposed on one side of the other of the two second circumferential grooves between the other of the two second circumferential grooves and the other of the two first circumferential grooves,
another second land portion disposed on the other side of the other of the two second circumferential grooves, and
the first lateral grooves extend from the first land portion across the one of the two second circumferential grooves and terminate within the second land portion, and
the second lateral grooves extend from the another first land portion across the other of the two second circumferential grooves and terminate within the another second land portion.

10. The tire according to claim 7, wherein
the groove width of the radially outer first portion is 1 to 2 mm.

11. The tire according to claim 10, wherein
the groove width of the radially inner second portion is 2 to 12 mm.

12. The tire according to claim 11, wherein
the groove width of the radially inner second portion is 2 to 6 times the groove width of the radially outer first portion.

13. The tire according to claim 10, wherein
a distance in the tire radial direction from a groove bottom of each of the two first circumferential grooves to a radially inner end of the radially outer first portion is in a range from ⅓ to ⅔ times a depth of each of the two first circumferential grooves.

14. The tire according to claim 13, wherein
each of the two first circumferential grooves comprise a third portion which is disposed outside the radially outer first portion in the tire radial direction, and in which the groove width is gradually increased toward the outside in the tire radial direction.

15. The tire according to claim 12, wherein
the two first circumferential grooves each have a cross sectional shape approximate to a teardrop shape, wherein
the radially outer first portion has a substantially constant width smallest in the two first circumferential grooves, and
the radially inner second portion comprising:
a groove bottom portion having a semicircular arc cross section, and
an intermediate portion extending from the groove bottom portion to the radially outer first portion while gradually decreasing the groove width.

16. The tire according to claim 15, wherein
the two second circumferential grooves each have a U-shaped cross-sectional shape.

* * * * *